3,723,075
MANUFACTURE OF ALUMINUM TRIBROMIDE
John W. Stevenson, Webster Groves, and Warren T. Trask, Olivette, Mo., assignors to Mallinckrodt Chemical Works, St. Louis, Mo.
No Drawing. Filed Mar. 5, 1971, Ser. No. 121,575
Int. Cl. C01f 7/48, 7/64
U.S. Cl. 423—495                                     5 Claims

ABSTRACT OF THE DISCLOSURE

Aluminum tribromide is prepared by reacting metallic aluminum with elemental bromine in a stirred liquid reaction medium consisting essentially of molten aluminum tribromide. Preferably the aluminum in the form of small pieces or particles is suspended in the molten aluminum tribromide and the elemental bromine is added incrementally to the surface of the reaction medium at a rate such that the temperature of the medium is preferably maintained within the range of about 100–140° C. The method is suitable for continuous operation.

BACKGROUND OF THE INVENTION

It is known that aluminum tribromide, useful as a catalyst and as a brominating agent for organic syntheses, can be prepared by heating aluminum metal to a temperature of about 140° C. or more and then adding elemental bromine. The reaction is strongly exothermic, and the large amount of heat thus liberated almost invariably causes localized hot spots in the reaction mass. Such hot spots can cause serious damage to metal or glass-lined reactors employed for the purpose, and the reaction could be controlled satisfactorily only by reacting the aluminum with bromine vapor in small laboratory scale glass equipment where the reaction mass can be continuously and carefully observed. For the aforementioned reasons, this potentially economical and useful reaction has heretofore been unsatisfactory for large scale commercial manufacture of aluminum tribromide.

SUMMARY OF THE INVENTION

Among the objects of the present invention may be noted the provision of methods for the preparation of aluminum tribromide from aluminum metal and elemental bromine which permit precise and uniform control of the reaction temperature; the provision of methods of the character described which can be carried out at a relatively low temperature and which are therefore suitable for large scale production employing glass-lined reactors; and the provision of methods of the character described which simplify recovery of the aluminum tribromide and are suitable for continuous operation. Other objects and features will be in part apparent and in part pointed out hereinafter.

The present invention is directed to a process for making aluminum tribromide wherein elemental bromine is contacted with metallic aluminum in a stirred reaction medium consisting essentially of molten aluminum tribromide. The reaction temperature may range up to approximately 225° C., but is preferably and advantageously maintained in the range of 100–140° C. Moreover, the aluminum is preferably in the form of small pieces or particles suspended in the reaction medium, while the liquid or gaseous bromine is added incrementally to the upper surface of the reaction medium, the bromine being added at such a rate so as to maintain the reaction temperature in the desired range.

DESCRIPTION OF THE PREFERRED EMBODIMENTS

In a simple embodiment of the invention, metallic aluminum in the form of small particles or pieces is added to a body of molten aluminum tribromide in a glass or glass-lined reactor provided with a stirrer, a reflux condenser, and means for adding elemental bromine to the surface of the melt. Gentle stirring is sufficient to keep the aluminum suspended in the melt. Elemental bromine, either gaseous or liquid, is then added to the surface of the melt at a rate such that the reaction temperature is maintained in the desired range. Once the reaction is commenced, the heat produced by the reaction is sufficient to maintain the desired temperature and no external source of heat is required.

The form of the metallic aluminum is not critical, and it may be in the form of powder, flakes, granules, pieces of wire and the like. Alternatively, the aluminum may be in the form of a wire gauze or a bed of aluminum granules or the like through which the molten aluminum tribromide containing dissolved bromine is continuously passed as by recirculating the molten aluminum tribromide therethrough in a closed system. The molten aluminum tribromide serves several functions. First, it provides a stirrable and wholly compatible medium for the metallic aluminum and elemental bromine. Even more important, however, it serves as a heat ballast and heat transfer medium thereby permitting more precise control of the reaction temperature, and, quite surprisingly, permitting the reaction to be carried out efficiently at substantially lower temperatures than have heretofore been feasible.

An important advantage of the present invention is that the reaction of bromine with metallic aluminum proceeds at a very satisfactory rate at unexpectedly low temperatures, i.e., as low as 100° C. Using conventional methods, i.e., essentially solid-gaseous reactions in the absence of a liquid reaction medium, temperatures in excess of 140° C. have been thought necessary. In accordance with the invention, it appears that significant amounts of bromine dissolve in aluminum tribromide at temperatures far above the boiling point of pure bromine, and it is primarily this dissolved bromine which reacts with the suspended aluminum metal.

The unusually low reaction temperature possible using the method of the present invention minimizes corrosion problems and permits the use of a glass-lined, steam-heated reactor.

It will be evident that the process of the present invention can readily be adapted for continuous or semicontinuous operation in a reactor provided with means for continuously adding aluminum metal and elemental bromine and removing the molten aluminum tribromide produced therefrom. Any bromine remaining dissolved in the aluminum tribromide may be removed under vacuum, for example.

The following examples illustrate the practice of the invention.

Finely powdered aluminum (10 g.) was added to about 700 g. of molten aluminum tribromide heated to a temperature of 125° C. To it was added 30 ml. (about 93 g.) of bromine over a period of 30 minutes air cooling, as necessary, by directing a stream of room temperature air against the bottom of the flask to keep the temperature in the range 125 to 135° C. All the bromine reacted within the next 30 minutes. This corresponds to a production rate of about 1.6 pounds per hour per gallon of reactor volume.

The preparation was repeated using ⅛ inch to ½ inch long pieces of ¹⁄₃₂ inch diameter aluminum wire. The reaction was complete in 40 minutes.

The preparation was again repeated allowing the temperature to rise to about 160° C. The reaction was complete in 30 minutes.

In accordance with the invention, large scale preparation of aluminum tribromide may be carried out by using a jacketed, glass-lined reactor equipped with a reflux condenser. The condenser serves not only to prevent the escape of bromine and aluminum tribromide vapors but also, by condensing these vapors and returning them to the reactor, it functions to remove excess heat from the reaction mixture. Any additional cooling of the reaction mixture, if necessary, is provided by circulating water through the jacket of the reactor.

In view of the above, it will be seen that the several objects of the invention are achieved and other advantageous results attained.

As various changes could be made in the above methods without departing from the scope of the invention, it is intended that all matter contained in the above description shall be interpreted as illustratve and not in a limiting sense.

What is claimed is:

1. The method of preparing aluminum tribromide which comprises contacting elemental bromine with metallic aluminum in a stirred reaction medium consisting essentially of molten aluminum tribromide.

2. The method according to claim 1 wherein the metallic aluminum is suspended in the molten aluminum tribromide.

3. The method according to claim 1 wherein elemental bromine is incrementally added to the molten aluminum tribromide.

4. The method according to claim 1 wherein the temperature is between approximately 100° C. and 140° C.

5. The method according to claim 2 wherein the metallic aluminum is periodically replenished and a portion of the molten aluminum tribromide is periodically removed from the reaction medium.

References Cited

UNITED STATES PATENTS

| | | | |
|---|---|---|---|
| 1,445,082 | 2/1923 | Jacobson | 23—93 |
| 1,825,212 | 9/1931 | Smith | 23—1 D X |
| 2,439,737 | 4/1948 | Houston | 23—93 |

OTHER REFERENCES

Ser. No. 393,258, Beck et al. (A.P.C.), published July 1943.

EDWARD STERN, Primary Examiner

U.S. Cl. X.R.

423—462, 491